(12) United States Patent
Colapietro et al.

(10) Patent No.: US 9,172,421 B2
(45) Date of Patent: Oct. 27, 2015

(54) STANDARD ANTENNA INTERFACE

(71) Applicant: Andrew LLC, Hickory, NC (US)

(72) Inventors: Julian R. Colapietro, Center Valley, PA (US); Charles J. Buondelmonte, Glen Gardner, NJ (US); Michael F. Bonczyk, Anna, TX (US); Jimmie L. Donaldson, Jr., Milford, NJ (US); Morgan C. Kurk, Sachse, TX (US); Ray K. Butler, Allen, TX (US); Steven Lee Schmutzler, Homer Glen, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/137,059

(22) Filed: Dec. 20, 2013

(65) Prior Publication Data

US 2014/0179244 A1 Jun. 26, 2014

Related U.S. Application Data

(60) Provisional application No. 61/907,259, filed on Nov. 21, 2013, provisional application No. 61/863,739, filed on Aug. 8, 2013, provisional application No. 61/791,947, filed on Mar. 15, 2013, provisional application No. 61/740,744, filed on Dec. 21, 2012.

(51) Int. Cl.
*H04B 1/38* (2015.01)
*H04B 1/40* (2015.01)
(Continued)

(52) U.S. Cl.
CPC ............... *H04B 1/40* (2013.01); *H01Q 1/1228* (2013.01); *H01Q 1/246* (2013.01)

(58) Field of Classification Search
CPC ..................................................... H04B 1/3816

USPC ................ 455/90.2, 424, 562.1, 569.2, 575.9
See application file for complete search history.

(56) References Cited

U.S. PATENT DOCUMENTS 6,126,128 A 10/2000 Costa et al.
6,922,174 B2 7/2005 Haunberger et al.
(Continued)

FOREIGN PATENT DOCUMENTS

EP 2 124 290 11/2009
EP 2 124 290 A1 11/2009
WO WO 2013/071206 A1 5/2013

OTHER PUBLICATIONS

International Search Report and Written Opinion for related PCT App. No. PCT/US2013/077123 dated Mar. 13, 2014.
(Continued)

*Primary Examiner* — Tuan H Nguyen
(74) *Attorney, Agent, or Firm* — Husch Blackwell LLP

(57) ABSTRACT

A modular wireless communications station includes a standard antenna interface, a wireless communications antenna, and a remote radio head. The standard interface includes an antenna mount for the wireless communications antenna and at least one radio head mount. The radio head mount includes at least one linear guided support structure. The wireless communications antenna includes a bracket configured to engage the antenna mount and at least one RF interconnection module, the wireless communications antenna being mounted on the antenna mount. The remote radio head(s) include a low friction car configured to engage the linear guided support structure of the standard interface and an RF connector configured to engage the RF interconnection module of the antenna. The remote radio head may slide into engagement with the antenna and locked into place.

17 Claims, 16 Drawing Sheets

(51) Int. Cl.
*H01Q 1/12* (2006.01)
*H01Q 1/24* (2006.01)

(56) References Cited

U.S. PATENT DOCUMENTS

| 7,362,237 B2* | 4/2008 | Lawlor et al. ............... 340/901 |
| 2009/0207094 A1* | 8/2009 | Yang et al. .................... 343/904 |
| 2009/0215493 A1 | 8/2009 | Yang et al. |
| 2010/0079346 A1 | 4/2010 | Olson et al. |
| 2012/0128040 A1 | 5/2012 | Kenington |

OTHER PUBLICATIONS

International Search Report regarding PCT/2013/077123, mailed Mar. 13, 2014 (5 pages).
International Search Report regardnig PCT/US2014/049971, mailed Feb. 17, 2015 (7 pgs.).
Written Opinion of the International Searching Authority regardnig PCT/US2014/049971, mailed Feb. 17, 2015 (8 pgs.).
International Preliminary Report on Patentability regarding related international application PCT/US2013/077123, dated Jul. 2, 2015 (8 pgs.).

* cited by examiner

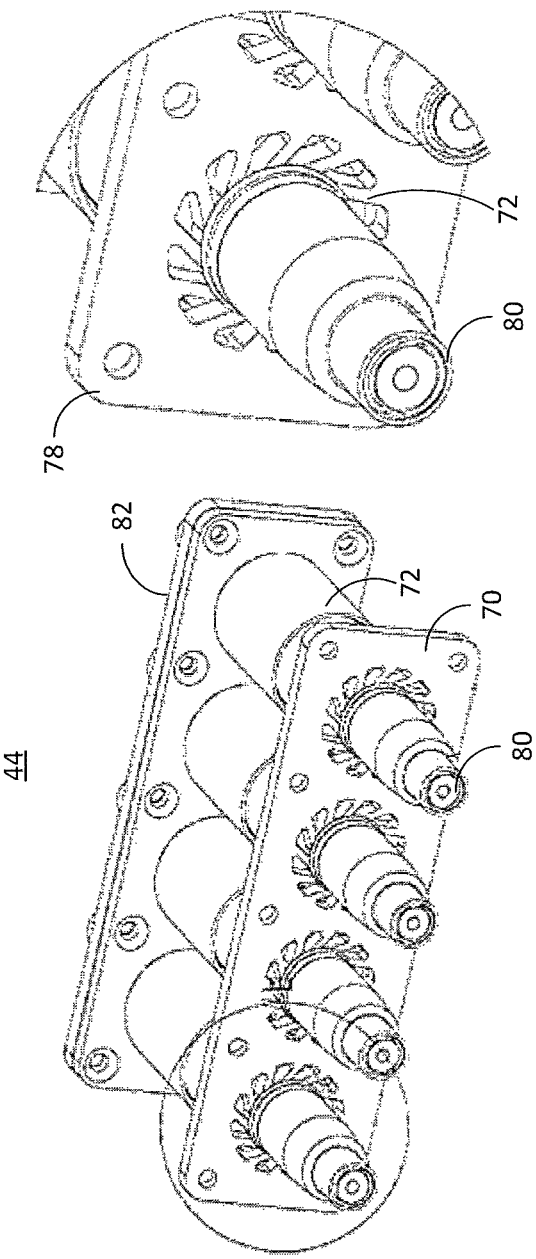

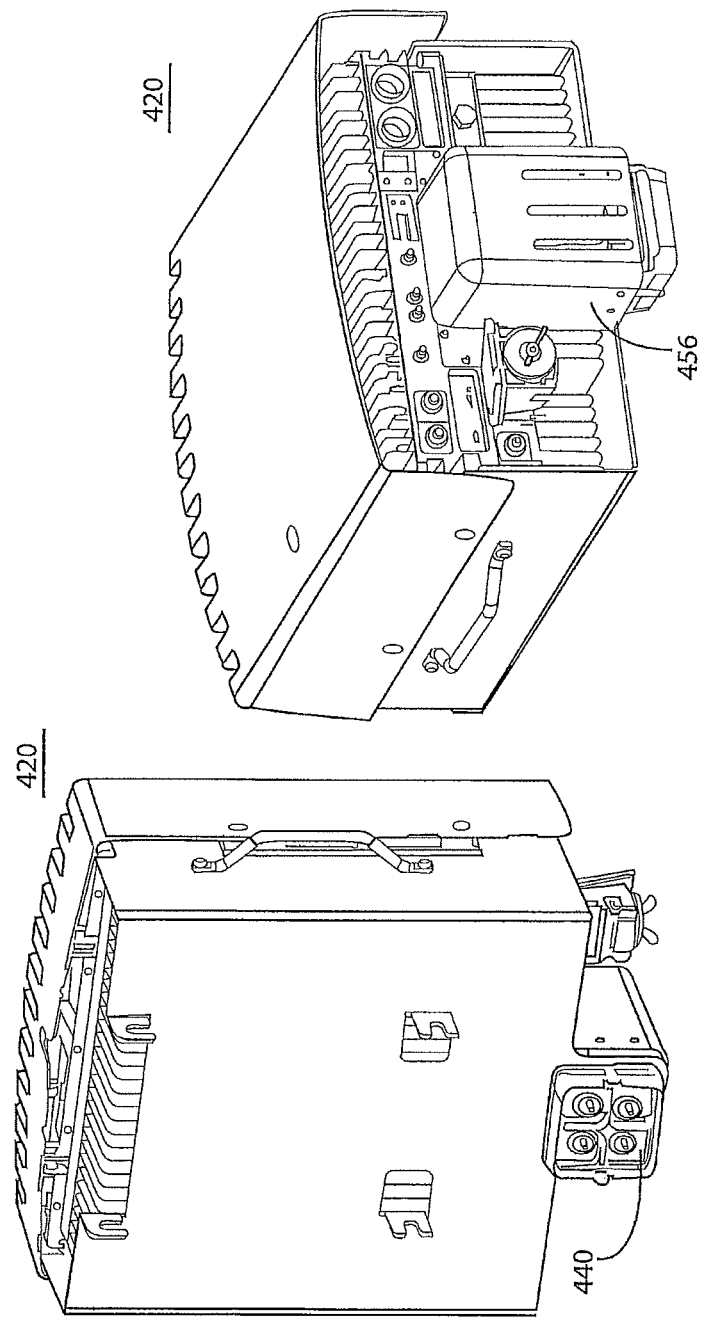

STANDARD ANTENNA INTERFACE

This application claims priority to the following U.S. Provisional Applications, pursuant to 35 U.S.C. §120: U.S. Provisional Application Ser. No. 61/907,259, filed 21 Nov. 2013; U.S. Provisional Application Ser. No. 61/863,739, filed 8 Aug. 2013; U.S. Provisional Application Ser. No. 61/791, 947, filed 15 Mar. 2013; and U.S. Provisional Application Ser. No. 61/740,744, filed 21 Dec. 2012.

BACKGROUND

The present inventions relate generally to wireless communications. In particular, they relate to improvements in wireless base station antenna and radio deployments.

A traditional installation of a wireless radio network system mounted at the top of the tower consists of a remote radio head (RRH) and a separate antenna. These components are mounted in separate locations and are cabled together using jumper cables to pass the radio frequency (RF) signal between them. Such an installation decreases the performance of the radio network, creates complex and time consuming installations, and introduces opportunities for installation errors. This invention creates a common mounting interface or enclosure that will standardize and simplify the installation of the antenna and remote radio head.

Current installations require multiple jumper cables and multiple mounting kits/hardware. This involves more installation time (approximately 12-15 hours per site). Jumper cables present RF losses and Passive Intermodulation products (PIM) performance issues. These issues degrade network performance, and add significant cost to the network operator to overcome. Jumper cables also require more weatherproofing, and additional capital expense and operating expense.

Since there is no common structure or installation method to mount the RRH and the antenna, it is up to the installation team to define the mounting method. This can result in installation errors, missing hardware, wrong cable lengths, and inadequate mounting hardware.

Once the antenna and RRH are mounted at the tower top, it is strictly up to the installer to cable and connect the components together correctly. The installer will need a schematic or wiring diagram to understand how such connections should be made. This introduces the possibility of installing cables at the wrong locations, improperly assembling connectors to the jumper cables, or not engaging them correctly.

Attempts to solve the limitations of the current system, typically involves integrating the radio modules of the RRH with the antenna into a single enclosure (Integrated or Active Antenna). Integrated antennas do not provide flexibility for the network operator to select different RRHs Or Antennas from different suppliers. The radio network operator is limited to the supplier of the active or integrated antenna and the performance and price of that system. The Integrated antenna approach also restricts the ability of the operator to leverage supplier diversity for the antenna products, or for the RRH units. It also limits the availability of new beamwidth antennas, as well as multi-beam antennas. The operator is further challenged to stock spares of expensive combined units.

Antennas are passive components and have an inherently lower failure rate than do Remote Radio Heads. Typical antenna return rates are less than 0.1% annually, while RRH return rates range from 3% to 5% typically. Thus, integrating an antenna and RRH in a single unit on the tower would require antennas to be replaced at the same rate as RRH's, increasing operating expenses.

Additionally, current installations are not visibly appealing due to non-standard mounting configurations and the use of multiple jumper cables. Such installations do not have the appearance of a well thought out solution.

SUMMARY OF THE INVENTION

A modular wireless communications station according to one example of the present invention includes a standard antenna interface, a wireless communications antenna, and a remote radio head. The standard interface includes an antenna mount for the wireless communications antenna and at least one radio head mount. The radio head mount includes at least one linear guided support structure facilitating RF connector interfaces to align and engage.

The wireless communications antenna includes a bracket configured to engage the antenna mount and at least one RF interconnection module, the wireless communications antenna being mounted on the antenna mount. The remote radio head(s) include a low friction car configured to engage the linear guided support structure of the standard interface and an RF connector configured to engage the RF interconnection module of the antenna. The remote radio head may slide into engagement with the antenna and be locked into place.

The modular wireless communications station may further comprise at least one diplexer having a low friction car configured to engage the linear guided support structure of the standard interface, an RF connector configured to engage the RF interconnection module of the antenna and a second RF interconnection module, wherein the diplexer slides into engagement with the antenna and the wherein the remote radio head slides into engagement with the diplexer.

In another example, a standard antenna interface includes an antenna mount for receiving mounting brackets of a communications antenna, a mount for tower-mountable equipment, and a RF interconnection module coupling the communications antenna to the tower-mountable equipment. The RF interconnection module may comprise a capacitive coupling. The tower-mountable equipment may comprise a remote radio head, a diplexer, a filter, or other tower-mountable equipment. Additionally, multiple items of such tower-mountable equipment may be accommodated, such as a diplexer and two or more remote radio heads.

The RF interconnection module may be integrated into the communications antenna and the tower-mountable equipment further comprises a RF connector for engaging the RF interconnection module. Alternatively, the standard antenna interface further comprises a frame, and the RF interconnection module is located on the frame of the standard antenna interface. In this example, both the tower-mountable equipment and the communications antenna further comprise a RF connector for engaging the RF interconnection module.

The mount for tower-mountable equipment may comprise a linear guided support structure, and the tower-mountable equipment may further comprise a trolley configured to engage the linear guided support structure. Alternatively, the mount for the tower-mountable equipment may include axially guided support structure, such as mounting pins, and the tower-mountable equipment includes brackets configured to engage and rotate on the axially guided support structure. Additionally, the linear guided support structure and the axially guided support structure may be used in combination. For example, the antenna may be mounted using the axially guided support structure and corresponding bracket, and the tower mountable equipment may be installed using the linearly guided supports and low friction cars.

BRIEF DESCRIPTION OF THE DRAWINGS

FIGS. 7a and 7b are perspective views illustrating certain details of connectors which may be used in connection with the first example of the present invention.

FIGS. 17a-17c illustrate a remote radio head adapted for use in another example of the present invention.

DESCRIPTION OF EXAMPLES OF THE INVENTION

A Standard Antenna Interface is described herein to overcome the limitations of a traditional RRH and antenna tower top installation. This invention creates a standard antenna interface that provides a reduced installation time, prevents the installer from directly touching/interfacing with the RF electrical path, creates a PIM free interface, and allows the network operator the flexibility to select any brand of antenna or RRH to install. This solution further enables the stocking of separate antennas and RRH's, thus reducing the cost of inventory. In addition, the higher failure rate RRH's can be replaced independently of the more reliable passive antennas.

The Standard Antenna Interface comprises of a standard interface structure, including antenna mounting brackets and RRH mounting structure, and a RF interconnection module. The standard interface structure acts as the mounting medium for both the antenna and the RRH. Both the antenna and RRH are mounted to their respective universal mounting structure. One mounting structure will receive the antenna and, optionally, all necessary interconnects, where the other bracket or mounting structure will receive the RRH and, optionally necessary interconnects. In embodiments where the Standard Interface Structure does not include RF interconnects, such RF interconnects are made directly between the antenna and the RRH. Each entity will mount directly to the standard interface structure and can be removed independently from each other. Preferably, the Standard Antenna Interface allows antennas and radios from different manufacturers to be coupled together in the field without adding jumper cables and/or ohmic connections.

Figure 1:
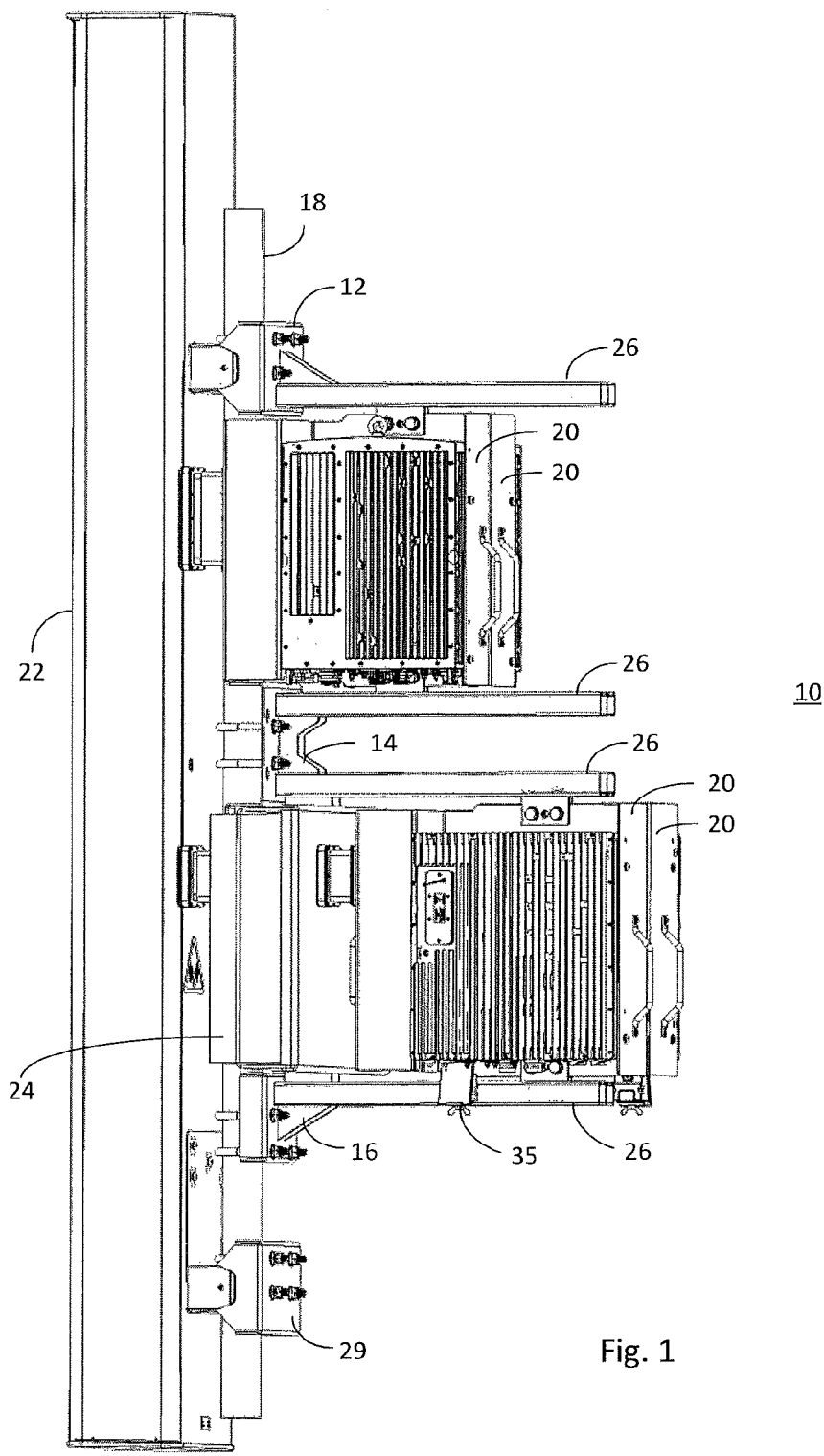
FIG. 1 is a perspective view of a first example of the present invention.
Figure 2:
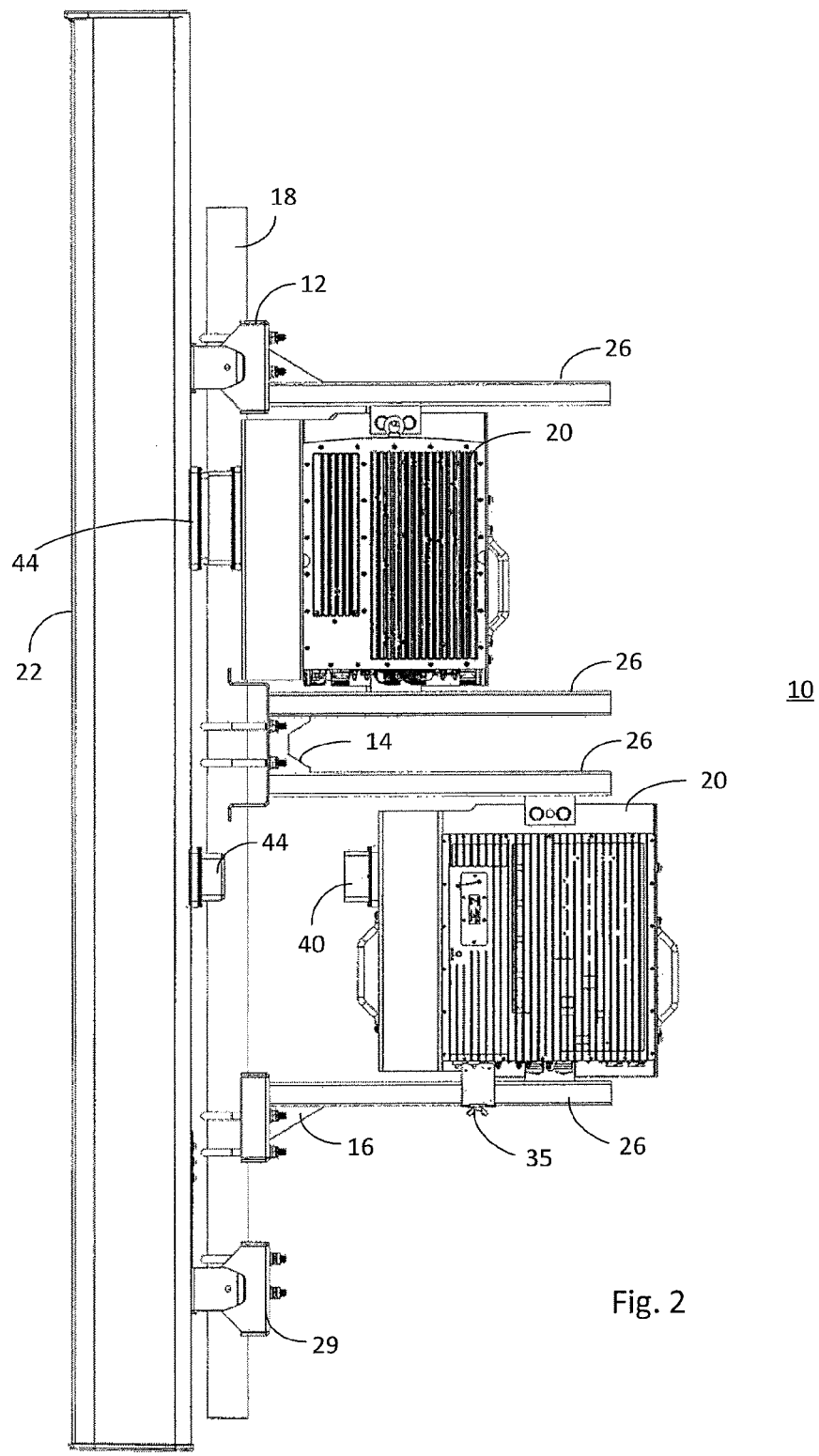
FIG. 2 is a side view of another aspect according to the first example of the present invention.

Referring to FIGS. 1 and 2, a first example of a Standard Antenna Interface 10 is disclosed. In this example, an Upper Tower Mount 12, and Middle Tower Mount 14 and a Lower Tower Mount 16 are mounted on a Mounting Pole 18. The Upper Tower Mount 12, and Middle Tower Mount 14 and a Lower Tower Mount 16 are configured to mechanically interface with a plurality of Remote Radio Heads 20 and an Antenna 22. Preferably, the Upper Tower Mount 12, and Middle Tower Mount 14 and a Lower Tower Mount 16 are configured to mechanically interface with a Diplexer 24 placed between a Remote Radio Head 20 and the Antenna 22.

The example illustrated in FIGS. 1 and 2 allows for the installation of up to four Remote Radio Heads 20. In an alternative example (not illustrated), when one or two Remote Radio Heads 20 are desired, the Middle Tower Mount 14 may be omitted.

The Upper Tower Mount 12 and the Lower Tower Mount 16 each include a Linear Guided Support 26. In the illustrated example, the Linear Guided Supports 26 comprise tracks that are configured to receive a roller trolley. However, alternative track and low friction car slide structures are within the scope of this invention and may be substituted. In this example, the Upper Tower Mount 12 includes an Antenna Mount 28. An additional Antenna Mount 29 is included on the Mounting Pole 18. The Antenna 22 includes Brackets 30, which include slots to engage Antenna Mount 28 and Antenna Mount 29. Middle Tower Mount 14 includes two Linear Guided Supports 26. The Linear Guided Supports 26 are on the opposite side of the Mounting Pole 18 from the Antenna 22 and extend away from the Antenna 22.

Alternatively, the Lower Tower Mount 16 may be structurally the same as Upper Tower Mount 12, but is inverted when mounted. The Upper Tower Mount 12 and the Lower Tower Mount 16 each include an Antenna Mount 28 in this example.

Figure 4:
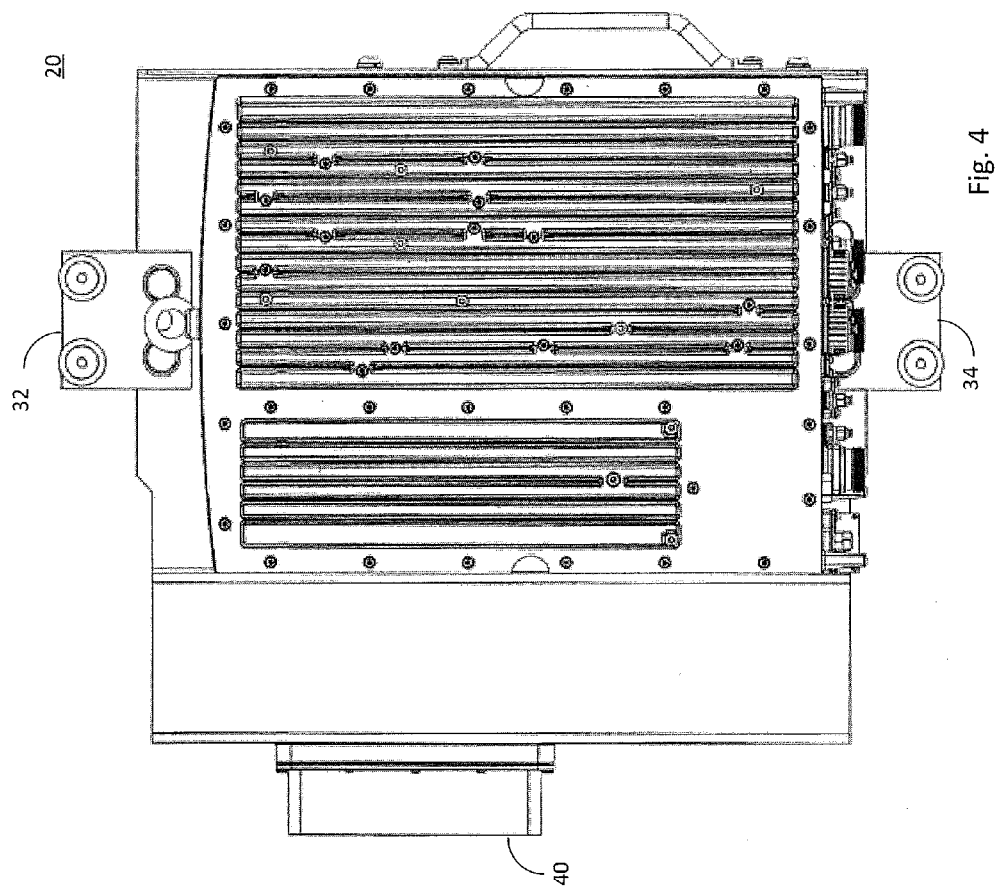
FIG. 4 is a side view of a remote radio head adapted for use in the first example of the present invention.
Figure 3:
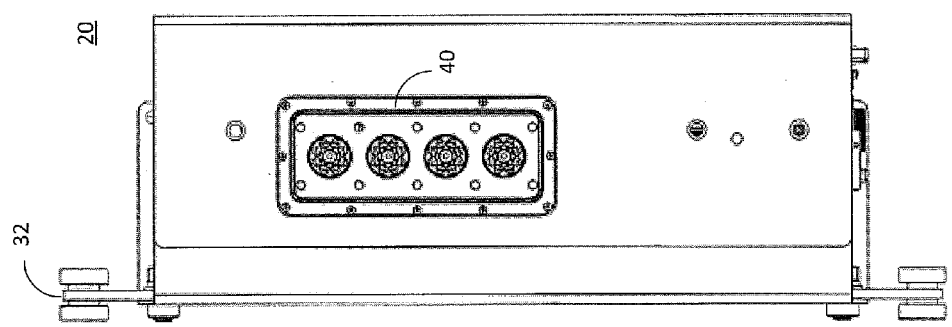
FIG. 3 is an end view of a remote radio head adapted for use in the first example of the present invention.

Referring to FIG. 3 and FIG. 4, the Remote Radio Head 20 includes an Upper Low Friction Car 32 and a Lower Low Friction Car 34. The Upper Low Friction Car 32 and a Lower Low Friction Car 34 each engage a respective Linear Guided Support 26. For example, when a Remote Radio Head 20 is installed in a lower location on the Standard Interface, the Upper Low Friction Car 32 engages a Linear Guided Support 26 of the Middle Tower Mount 14 and the Lower Low Friction Car 34 engages the Linear Guided Support 26 of the Lower Tower Mount 16. In the illustrated example, the Upper Low Friction Car 32 and the Lower Low Friction Car 34 each comprise a wheeled trolley. However, alternative low friction non-wheeled cars are also contemplated and may be substituted for the wheeled trolleys.

Each Remote Radio Head 20 includes a RRH Connector 40. The Antenna 20 includes a plurality of integrated RF Interconnection Modules 44 designed to engage a respective mating RRH Connector 40. Alternatively, the RF Interconnection Module 44 may be located on the Standard Antenna Interface 10, and the Antenna 20 may be provided with a connector.

Once the Upper Low Friction Car 32 and the Lower Low Friction Car 34 are engaged in their respective Linear Guided Supports 26, the Remote Radio Head 20 may then slide into engagement with Antenna 22. Specifically, the RRH connector 40 is mated with its respective RF Interconnection Module 44. The Remote Radio Head 20 may mate directly with the antenna, or optionally, a Diplexer 24 may be included between two Remote Radio Heads 20 and the Antenna 22. The Remote Radio Head 20 may be locked into place with Lock 35.

When a Diplexer 24 is used, the Diplexer 24 will include two sets of RF Interconnection Modules 44 facing the Remote Radio Heads 20. The Diplexer 24 also includes one RRH Connector 40 facing the Antenna 22. The Antenna 22 may be configured to have a single RF Interconnection Module 44 facing the Diplexer 24. The Diplexer 24 includes a pair of Upper Low Friction Cars 32 and a pair of Lower Low Friction Cars 34. In addition to Remote Radio Head 20 and Diplexer 24, additional types of tower-mountable equipment, such as filters, may be accommodated by the Standard Antenna Interface 10.

An assembly may comprise as few as one antenna and one Remote Radio Head 20. However, as illustrated in the figures, each Linear Guided Support 26 may include two channels to accept two Remote Radio Heads 20, and there may be more than one pair of Linear Guided Supports 26 for each Antenna 22. In the illustrated examples, there may be four Remote Radio Heads 20 coupled to the Antenna 22.

The example of FIGS. 1-4 enable straight-in, linear engagement of the RF connectors. This allows for an improved design of blind-matable, capacitively coupled RF connectors to be employed. An example of such a long-engagement is illustrated in FIGS. 5 and 6.

Figure 6:
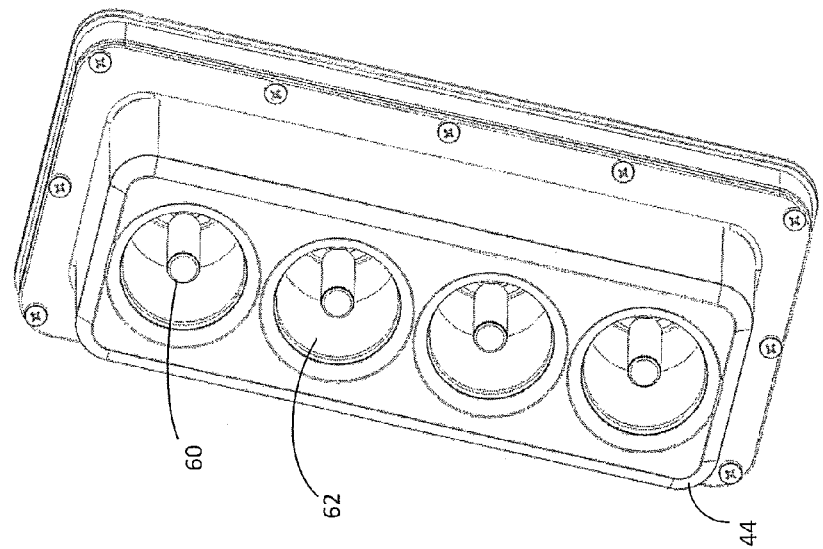
FIG. 6 is a perspective view of an antenna connector adapted for use in the first example of the present invention.
Figure 5:
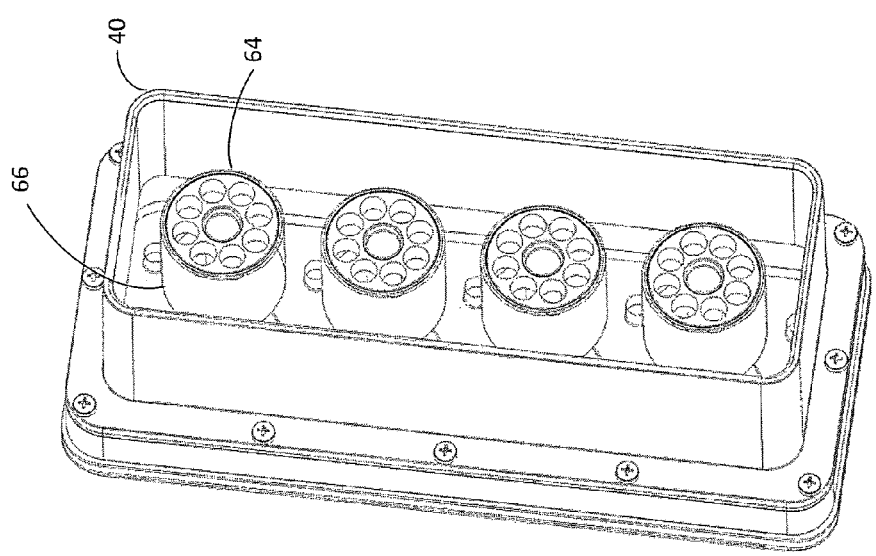
FIG. 5 is a perspective view of a remote radio head connector adapted for use in the first example of the present invention.
Figure 8:
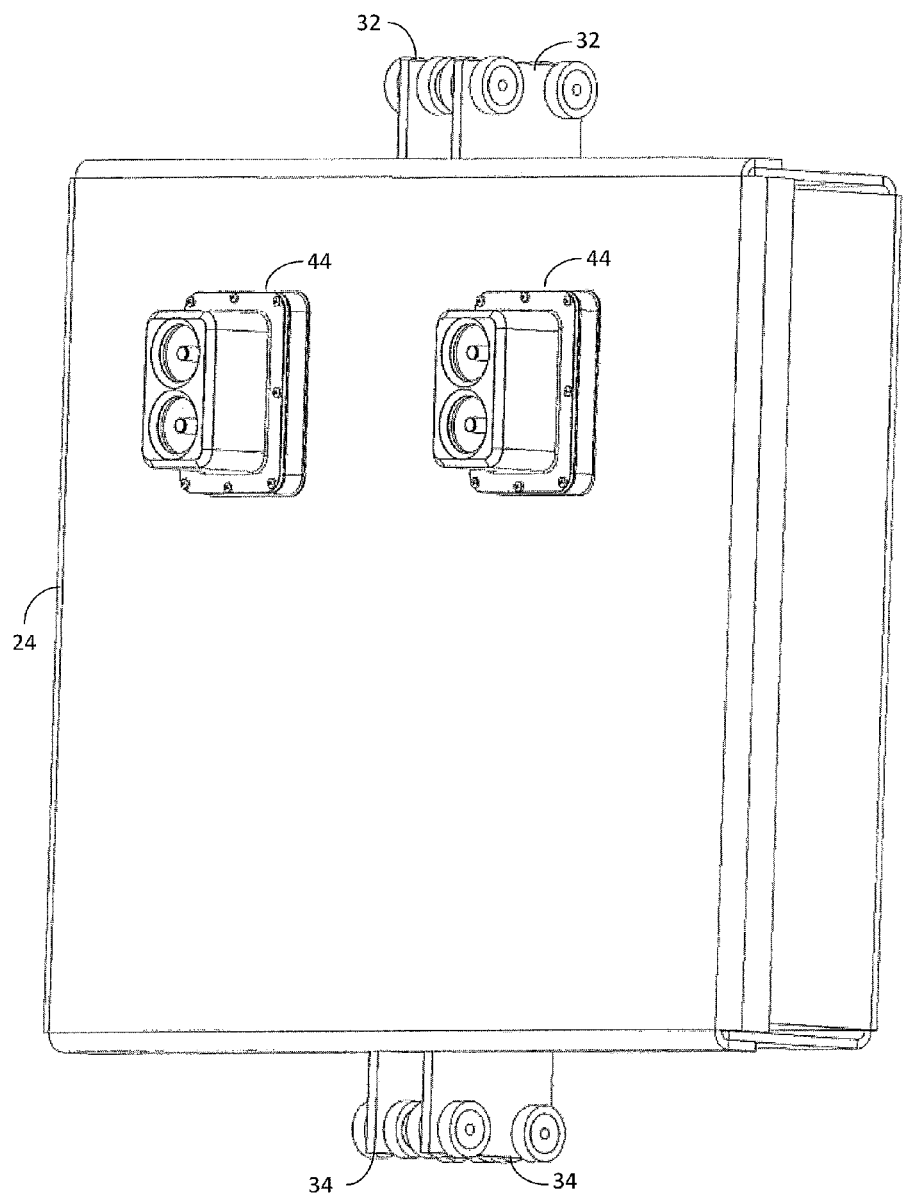
FIG. 8 is a perspective view of a diplexer connector adapted for use in the first example of the present invention.

As illustrated in FIGS. 5 and 6, RF Interconnection Module 44 and RRH Connector 40 may comprise a blind mate connector of coaxial construction. In one example, the RF Interconnection Module 44 may include includes a central conductor extension having a generally Cylindrical Post 60 and an Outer Conductor Extension 62. The Cylindrical Post 60 may be covered by a dielectric layer, such as one formed of a polymeric shrink sleeve. The RRH Connector 40 may include a Central Conductor Extension 64 that is adapted to receive the Cylindrical Post 60 of the RF Interconnection Module 44, and an Outer Conductor Extension 66 configured to fit within the Outer Conductor Extension 62. A dielectric layer overlies the Outer Conductor Extension 66. The dielectric layers prevent an ohmic connection between the conductor extensions and ensure that the coupling is capacitive, reducing the possibility of Passive Intermodulation (PIM).

The RF Interconnection Module 44 may include a float plate to improve alignment of capacitive, blind mate connectors. Referring to FIGS. 7a and 7b, portions of an Interconnection Module 44 including a Float Plate 70 are illustrated. The float plate 70 may receive blind mated coaxial connectors within each opening; four such interconnections, designated at 72 illustrated in FIGS. 7a and 7b. The float plate 70 is typically mounted to a rigid structure, such as a back of an antenna, that includes openings that align with the openings in the float plate 70. The openings in the rigid structure are sufficiently large that they do not interfere with flexure of the fingers 76 normal to the main body panel 78. Exemplary environments in which float plates may be employed with blind-matable connectors are discussed in U.S. Patent Publication No. 2013/0065415 to Van Swearingen et al., the disclosure of which is hereby incorporated herein by reference in its entirety.

As can be understood with reference to FIGS. 7a and 7b, as a connector 80 is inserted into the float plate 70, the fingers can flex to help to compensate for any misalignment of the connector 80 relative to its mating connector 82. Such misalignment is not uncommon due to minor tolerance differences in the sizes of the connectors 80, 82 and their components.

Figure 9A:
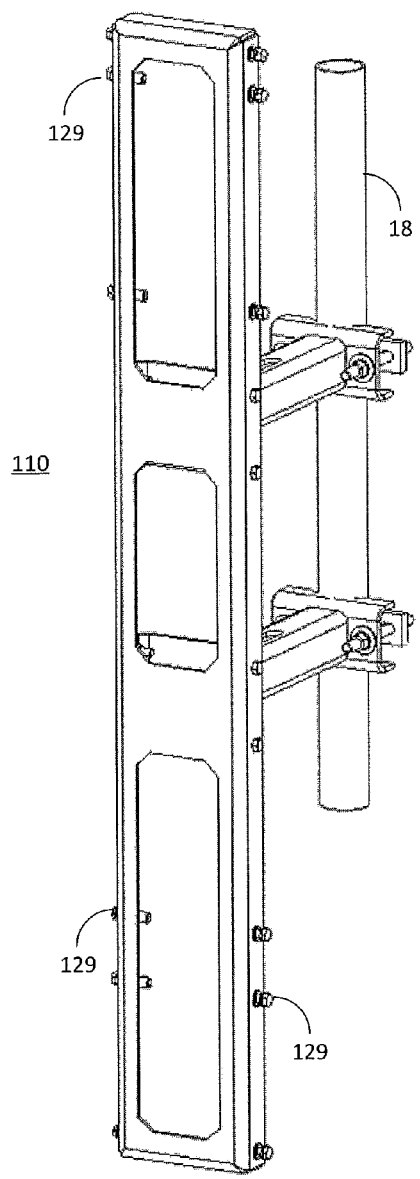
FIGS. 9a and 9b are perspective views of a standard antenna interface according to a second example of the present invention.
Figure 9B:
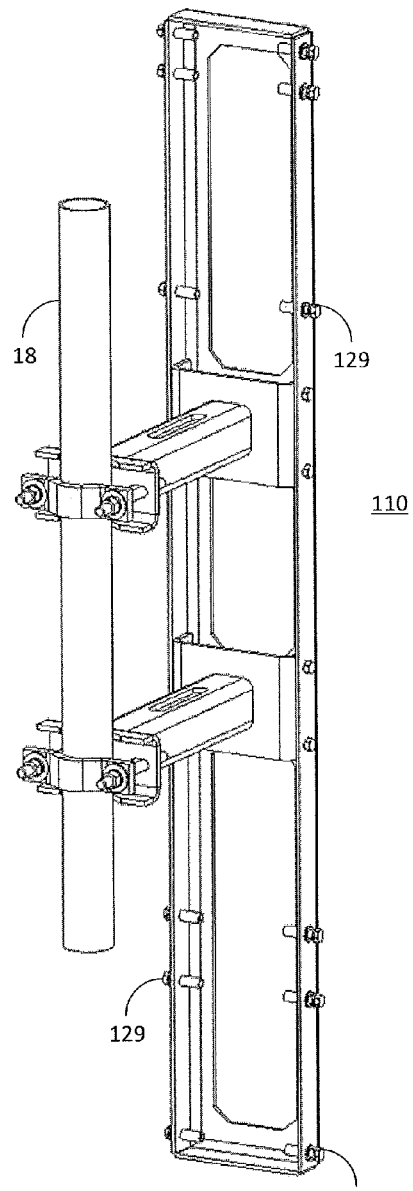

While a rolling, straight-in engagement is advantageous, another example employs a pivoting, axially guided engagement. Referring to FIGS. 9a, 9b, 10a and 10b, the Standard Antenna Interface 110 mounts away from the pole or the wall and houses the Antenna 122 and Remote Radio Head 120 on one side of the pole. In this example, the Standard Antenna Interface 110 is constructed out of formed sheet metal. However, the Standard Antenna Interface 110 may also be constructed out of metal rectangular tubing. As in the example above, an RF Interconnection Module 144 is integrated into Antenna 122 (FIG. 10a).

Figure 10B:
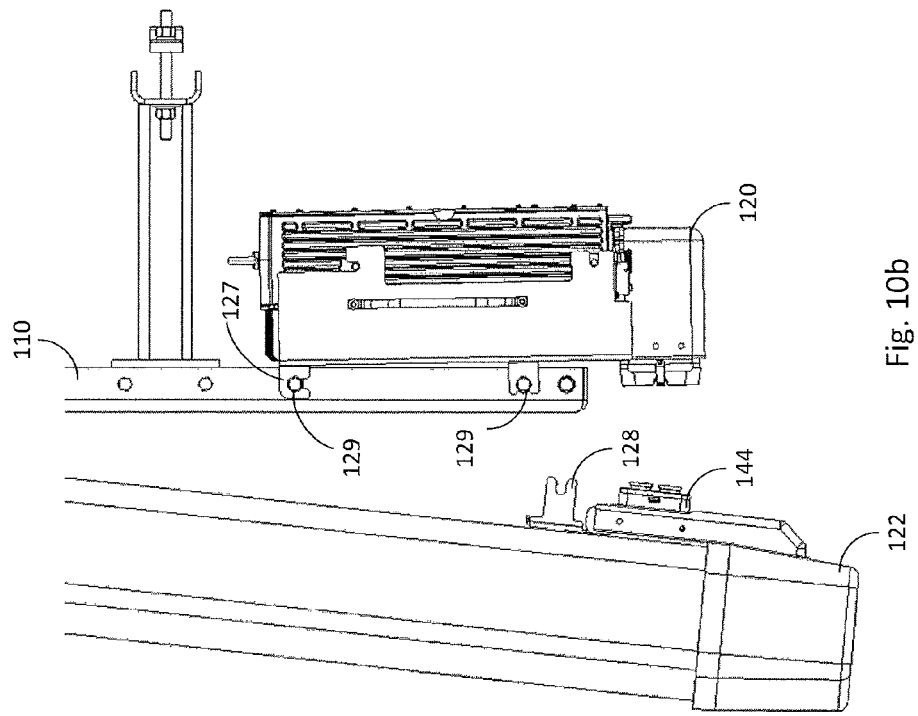
FIGS. 10a and 10b are side views of the standard antenna interface of the second example.
Figure 10A:
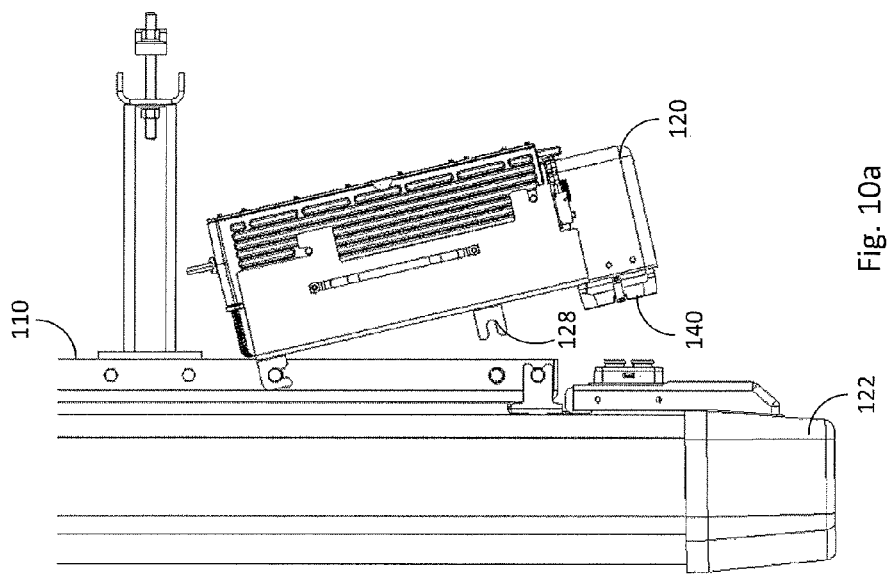

Referring to FIGS. 10a and 10b, a Remote Radio Head may be connected to the Standard Antenna Interface 110. The Remote Radio Head 120 includes mounting a hooked Mounting Bracket 127 and a slotted Mounting Bracket 128. The Standard Antenna Interface 110 includes Pins 129, which comprise axially guided support structure. The hooked Mounting Bracket 127 and a slotted Mounting Bracket 128 engage the Pins 129 of the Standard Antenna Interface (FIG. 9a), and allow the Remote Radio Head 120 to rotate into engagement (FIG. 9b). In another example, The Standard Antenna Interface 110 may be configured receive two or more Remote Radio Heads 120. The Antenna 122 also has a hooked Mounting Bracket 127 (not illustrated) and a slotted Mounting Bracket 128 that engages Pins 129 and allows Antenna 122 to be rotated into engagement in a similar manner.

The Remote Radio Head 120 may be installed and/or removed from the Standard Antenna Interface 110 without moving the Antenna 122 (10a). Similarly, the Antenna 122 may be installed and/or removed from the Standard Antenna Interface 110 without moving the Remote Radio Head 120 (10b). In another example, the hooked Mounting Bracket 127 and the slotted Mounting Bracket 128 may be replaced with a single piece mounting bracket. The linear guided support structure and the axially guided support structure may also be used in combination. For example, an antenna may be mounted using the axially guided support structure, such as Pins 129 and corresponding Hooked Mounting Bracket 127, and tower mountable equipment may be installed using Linearly Guided Supports 26 and Low Friction Cars 32, 34.

Figure 11:
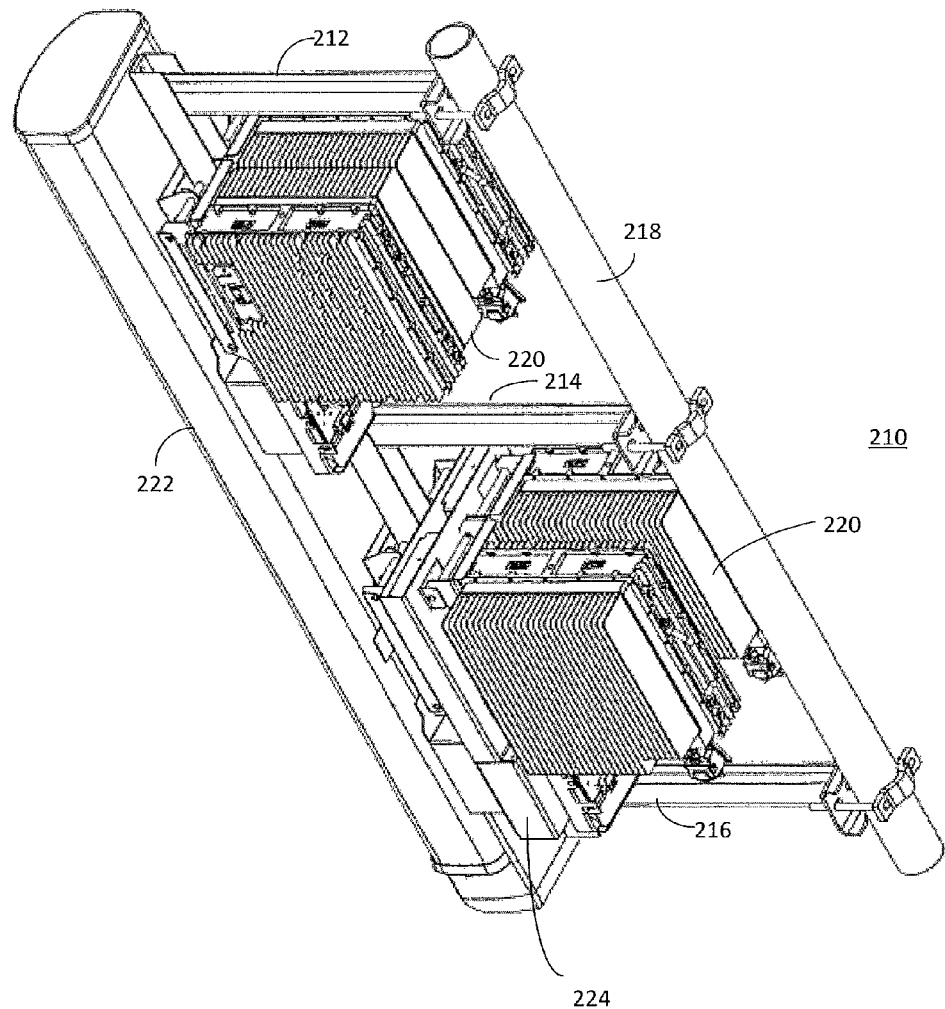
FIG. 11 is a perspective view of a third example of the present invention.
Figure 12:
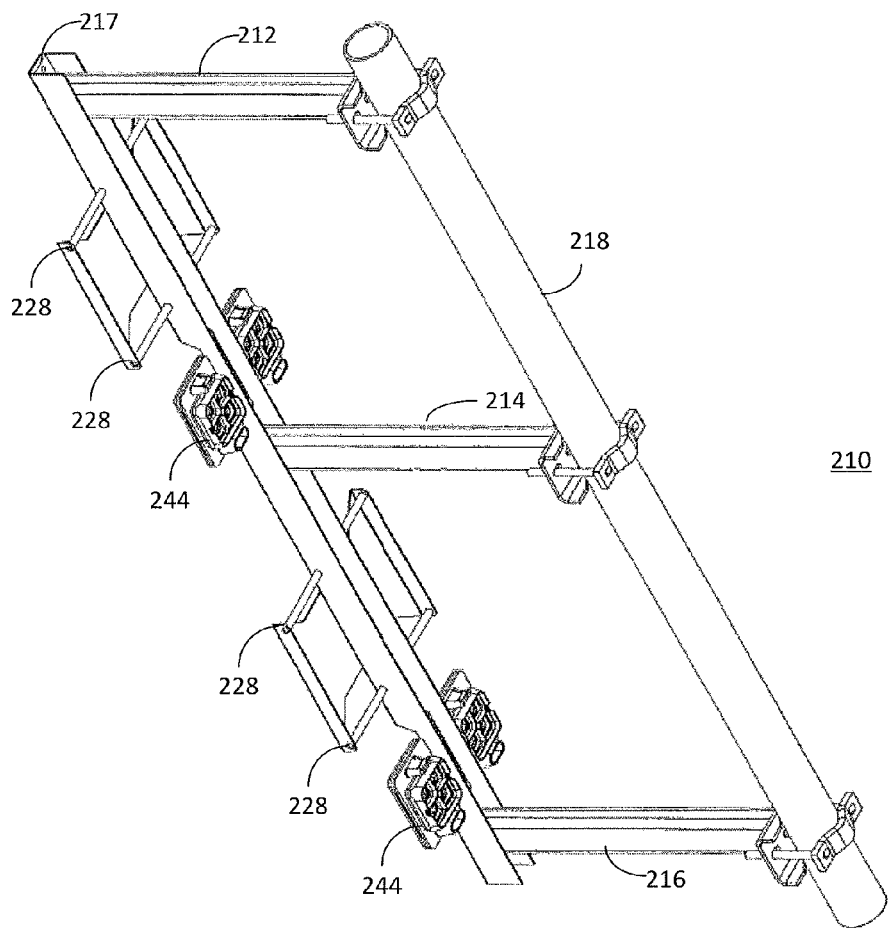
FIG. 12 is a perspective view of a standard antenna interface according to the third example of the present invention.

Referring to FIGS. 11 and 12, a perspective view of an additional example is illustrated. In this example, the Standard Antenna Interface 210 accommodates an Antenna 222 and up to four RRH Remote Radio Heads 220. In this example, the Standard Antenna Interface 210 is mounted to a pole. The Standard Antenna Interface 210 includes Cross Members 212, 214, and 216, and a Vertical Member 217.

Figure 13:
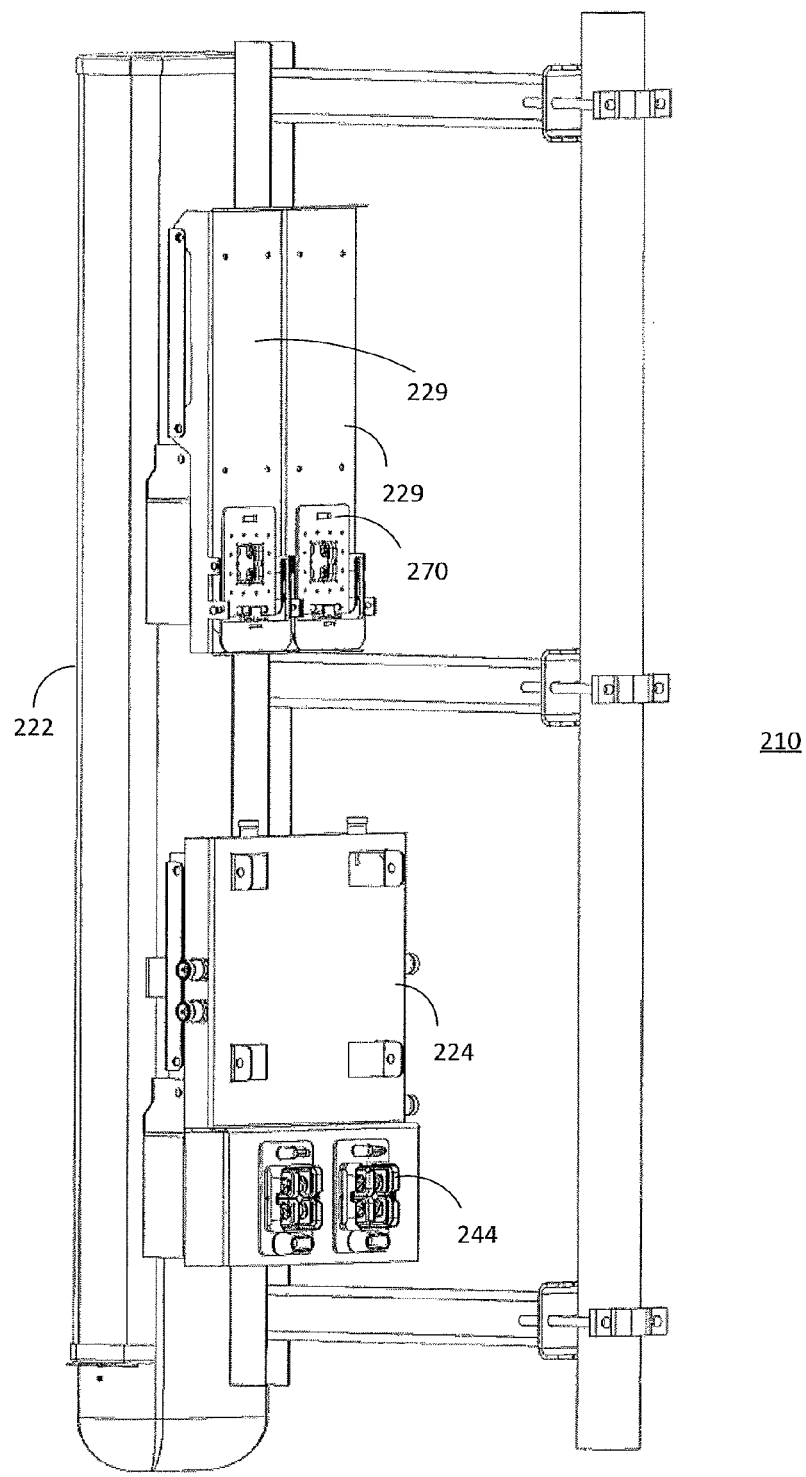
FIG. 13 is a perspective view of the third example of the present invention with additional components.
Figure 14:
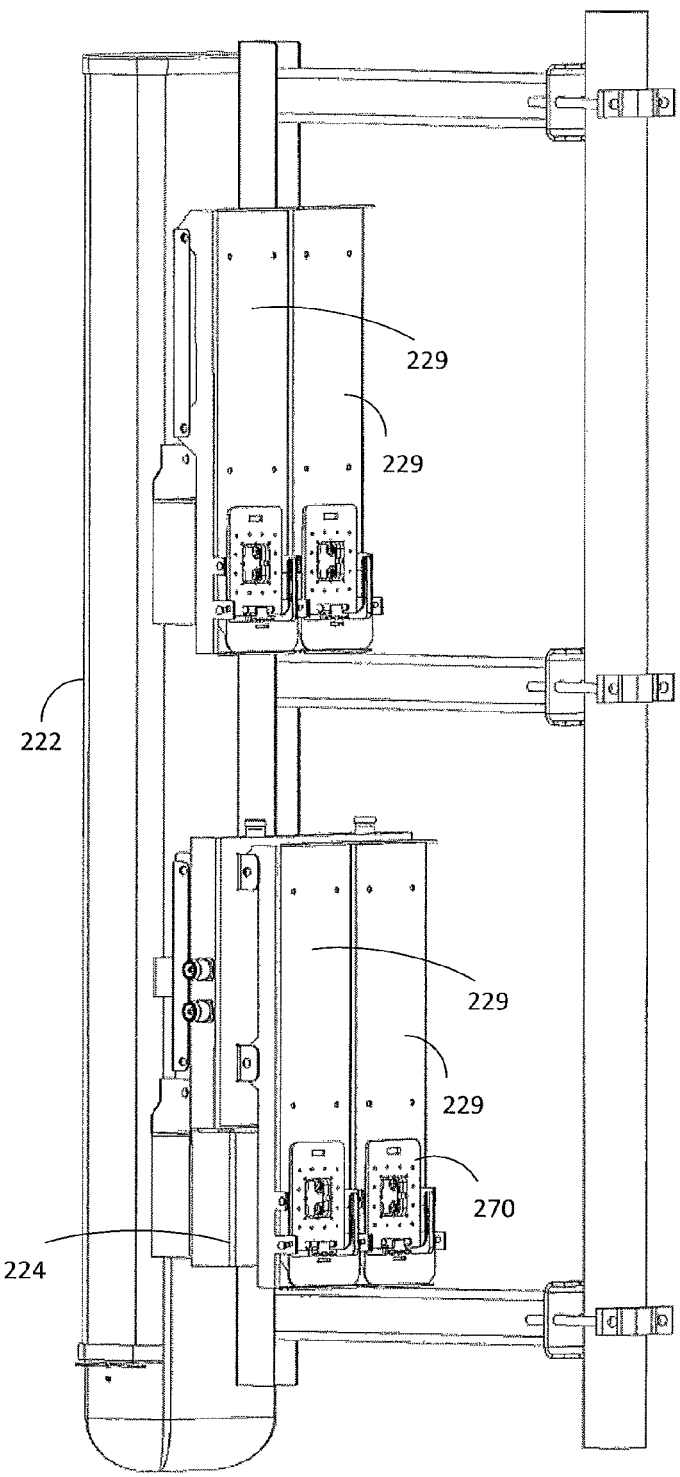
FIG. 14 is a perspective view of the third example of the present invention with additional components.

Referring to FIG. 12, the Standard Antenna Interface 210 includes Mounting Points 228 for the Antenna 222 and RF Interconnection Modules 244. Referring to FIG. 13, an Antenna 222 mounted to the Standard Antenna Interface 210. Mounting Brackets 229 for receiving Remote Radio Heads 120 are also installed on the Standard Antenna Interface 210 in an upper position. Float Plates 270 may be included on the Mounting Brackets 229. Additionally, an optional Diplexer 224 is mounted on the Standard Antenna Interface 210. FIG. 14 continues the example of FIG. 13, with the inclusion of Mounting Brackets 229 being installed on the Diplexer 224. The Remote Radio Heads 220 may be mounted on the Diplexer 224 in the same way that they would be mounted directly to the Standard Antenna Interface 210. The Mounting Brackets 224 include an RF Interconnection Module 244, which interfaces with Antenna Connector 242 and connectors on the Remote Radio Head (not illustrated).

The installation of the Diplexer 224 on the lower mounting brackets is just one example; a Diplexer 224 may be included on the upper mounting brackets, the lower mounting brackets, both mounting brackets, or omitted altogether. This flexibility in optionally including a diplexer is an advantage of this example.

The RF Interconnection Module 244 comprises a blind mate RF connector system that provides 7/16 DIN type RF performance in a blind mate approach for fast and robust component interfacing. The RF Interconnection Module 244 may include capacitively coupled interfaces and/or connectors such as those described in U.S. patent application Ser. Nos. 13/672,965, 13/673,084 and 13/673,373, which were filed on Nov. 9, 2012, and the disclosures of which are incorporated by reference.

Figure 15A:
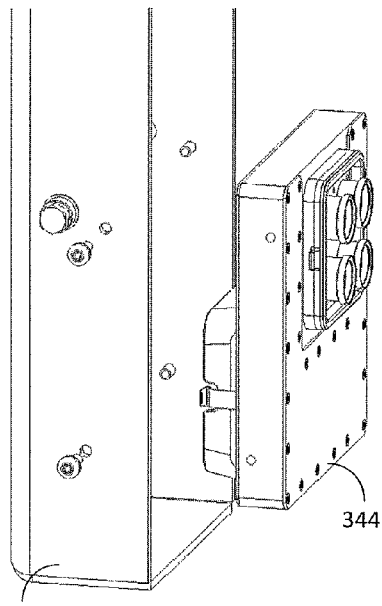
FIGS. 15a-15c illustrate a combination of features from the second and third examples of the present invention.
Figure 15B:
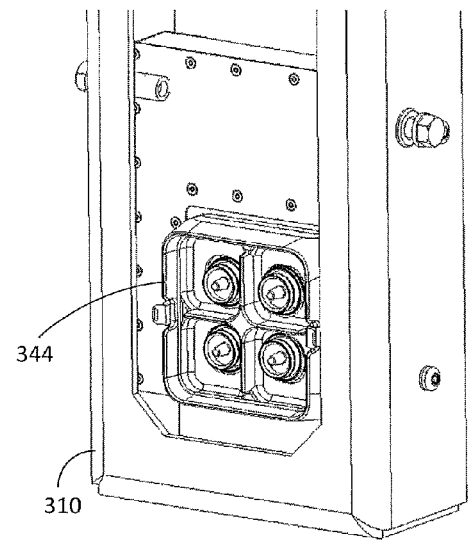
Figure 15C:
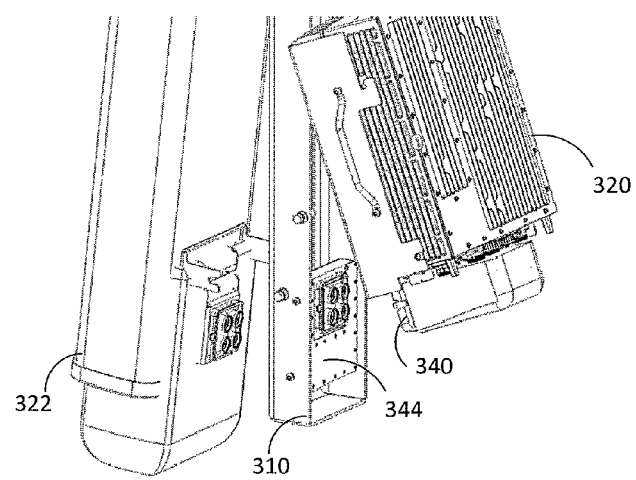

Referring to FIG. 15, an example of a Standard Antenna Interface 310 including an RF Interconnection Module 344 is illustrated. RRH Connector 340 of Remote Radio Head 320 engages one side of the RF Interconnection Module 344, and Antenna Connector 320 of Antenna 322 engages the other side of the RF Interconnection Module 344.

Figure 16B:
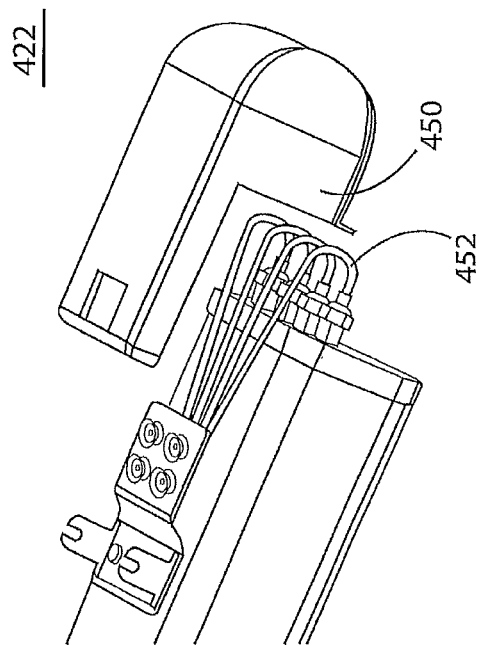
FIGS. 16a-16b illustrate an antenna adapted for use in another example of the present invention.
Figure 16A:
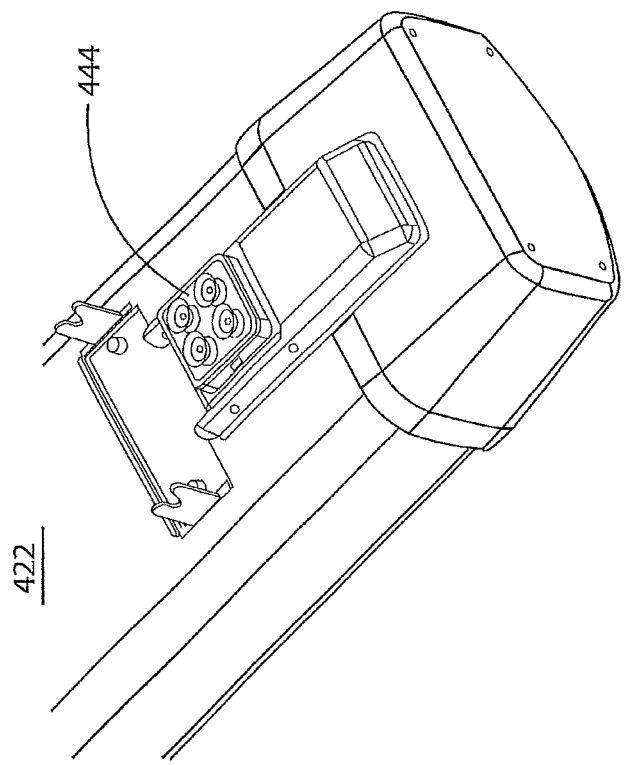
Figure 17C:
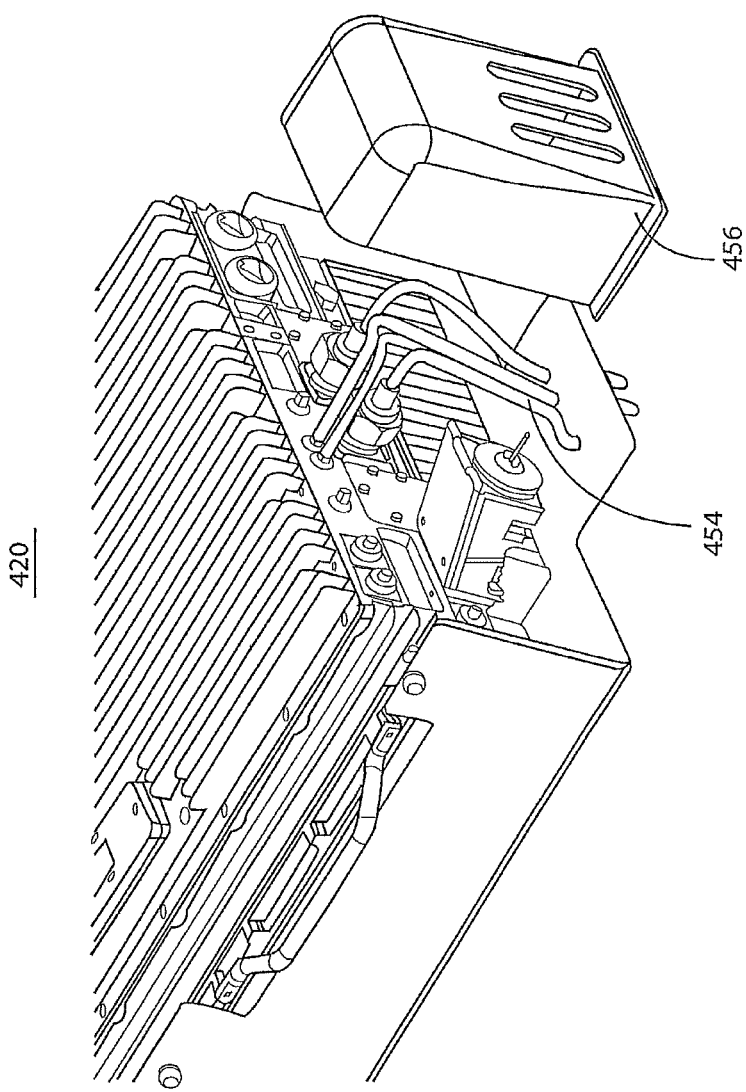

Referring to FIGS. 16a-16b and 17a-17c, examples of an Antenna 422 and a Remote Radio Head 420 including RF Interconnection Modules 444 and 440 are illustrated. FIG. 16b illustrates RF jumper cables 452 connected from a bottom of an Antenna 422 to an RF interconnector module 444. Similarly, FIG. 17c illustrates RF jumper cables 454 connected from an RRH 420 to an RF interconnector module 440. Jumper cables 452 and 454 may include metal-to-metal ohmic connectors on the one hand for attachment to the RRH 420 or antenna 440 and capacitive connectors on the other hand for attachment to the RRH Connector 440 or RF Interconnection Module 444 In these examples, installation of the RF Interconnection Module 444 of Antenna 422 and RRH Connector 440 occurs prior to traveling to the deployment site so that the harness and all jumper cabling 452 and 454 (in FIGS. 16b and 17c) can be concealed behind a covers 450 and 452 (in FIGS. 16b, 17b and 17c). Such concealment prevents the Installer from touching or otherwise interfacing with this RF path and may provide an aesthetically pleasing look.

The present invention is not limited to remote radio heads and antennas. Universal mounting brackets may also be used to mount additional items of tower-mountable equipment.

In another example, the standard interface structure mounts directly to the pole and allows the RRH and the antenna to straddle the pole. The standard interface structure includes an RF interconnection module, which is moved off to the side so it avoids the pole when the RRH and antenna are engaged. The RRH and Antenna mount directly to the standard interface structure, and each may be removed independently.

In another example, instead of mounting to a pole, the Standard Antenna Interface may replace a pole in a tower installation. In this example, the structure may comprise rectangular tubing or round tubing with an extended pipe tubing at both ends. The RF interconnect mates inside the center structure and is concealed within the structure when the antenna and RRH are installed.

In another example, additional functionality is added to the standard antenna interface by way of RF filtering and/or amplification. Additional modules, such as a tower mount amplifiers (TMA) or RF filters, may be added within the standard interface structure. These modules will contain an RF interconnection module on one or both sides, enabling it to directly connect to the antenna or RRH. The modules may be removable separate entities, or permanently embedded into the standard interface enclosure.

What is claimed is:

1. A modular wireless communications station, comprising:
    a. a standard antenna interface, having an antenna mount for a wireless communications antenna and at least one radio head mount, each radio head mount having at least one elongated linear guided support structure extending away from the antenna mount;
    b. a wireless communications antenna having a bracket configured to engage the antenna mount and at least one RF interconnection module, the wireless communications antenna being mounted on the antenna mount;
    c. at least one remote radio head having a low friction car configured to engage the linear guided support structure of the standard antenna interface and an RF connector configured to engage the RF interconnection module of the antenna.

2. The modular wireless communications station, of claim 1, wherein the remote radio head slides into engagement with the antenna and locks into place.

3. The modular wireless communications station, of claim 1, further comprising at least one diplexer having a low friction car configured to engage the elongated linear guided support structure of the standard antenna interface, an RF connector configured to engage the RF interconnection module of the antenna and a second RF interconnection module, wherein the diplexer slides into engagement with the antenna and the wherein a plurality of remote radio heads slide into engagement with the diplexer.

4. The modular wireless communications station, of claim 1, wherein the at least one remote radio head comprises a plurality of remote radio heads.

5. The modular wireless communications station of claim 1, wherein the RF interconnection module and RF connector comprise a capacitive coupling.

6. The modular wireless communications station of claim 1, wherein the elongated linear guided support comprises a track, and the low friction car comprises a wheeled trolley.

7. The modular wireless communications station of claim 1, wherein the antenna mount comprises axially guided support structure, and the bracket of the antenna comprises hooks to engage and rotate on the axially guided support structure.

8. The modular wireless communications station of claim 1, further comprising a mounting pole, wherein the antenna mount is disposed on a first side of the mounting pole and the at least one radio head mount is disposed on a second side of the mounting pole.

9. The modular wireless communications station of claim 8 wherein the first side of the mounting pole and the second side of the mounting pole are opposite one another.

10. The modular wireless communications station of claim 9 wherein, when the wireless communications antenna and the remote radio head are engaged with the standard antenna interface, all three lie in the same plane.

11. A standard antenna interface, comprising:
    a. an antenna mount for receiving mounting brackets of a communications antenna;
    b. a mount for tower-mountable equipment,
    c. a RF interconnection module coupling the communications antenna to the tower-mountable equipment, wherein the RF interconnection module comprises a blind-mate capacitive coupling.

12. The standard antenna interface of claim 11, wherein the RF interconnection module is integrated into the communications antenna and the tower-mountable equipment further comprises a RF connector for engaging the RF interconnection module.

13. The standard antenna interface of claim 11, further comprising a frame, wherein the RF interconnection module is located on the frame of the standard antenna interface, the tower-mountable equipment further comprises a first RF connector for engaging the RF interconnection module, and the communications antenna further comprises a second RF connector for engaging the RF interconnection module.

14. The standard interface of claim 11, wherein the mount for tower-mountable equipment comprises a linear guided support structure, and the tower-mountable equipment further comprises a trolley configured to engage the linear guided support structure.

15. The standard interface of claim 11, wherein the mount for the tower-mountable equipment further comprises axially guided support structure, and the tower-mountable equipment further comprises brackets configured to engage and rotate on the axially guided support structure.

16. The standard interface of claim 11, wherein the tower-mountable equipment further comprises a remote radio head.

17. The standard interface of claim 11, wherein the tower-mountable equipment further comprises a plurality of remote radio heads.

\* \* \* \* \*